H. T. THOMAS.
STEERING GEAR.
APPLICATION FILED OCT. 10, 1917.

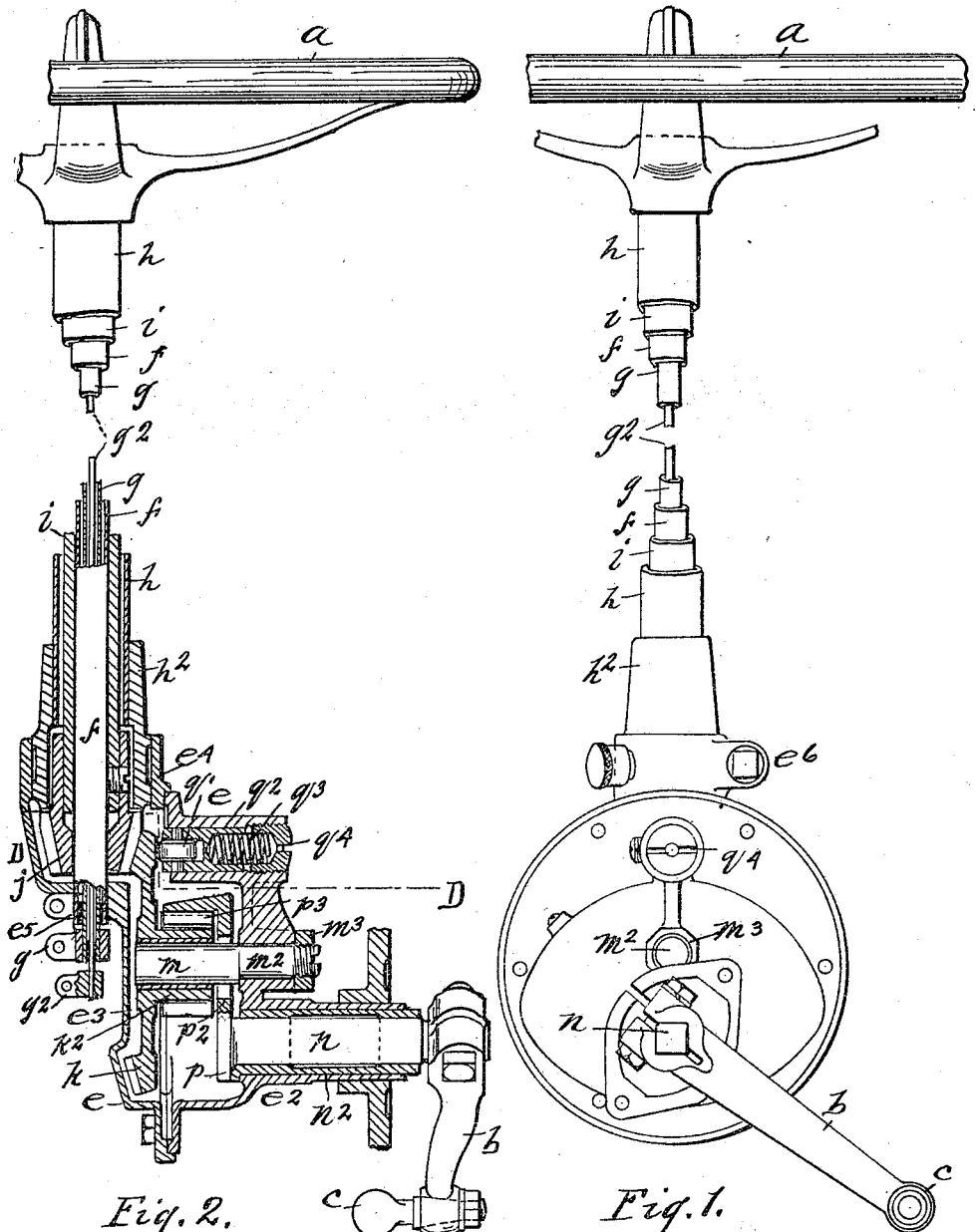

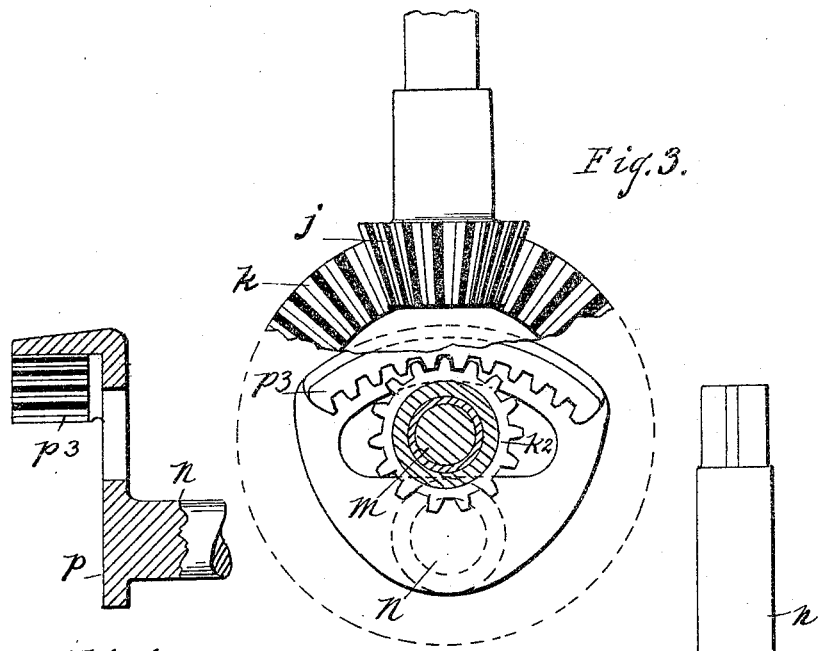
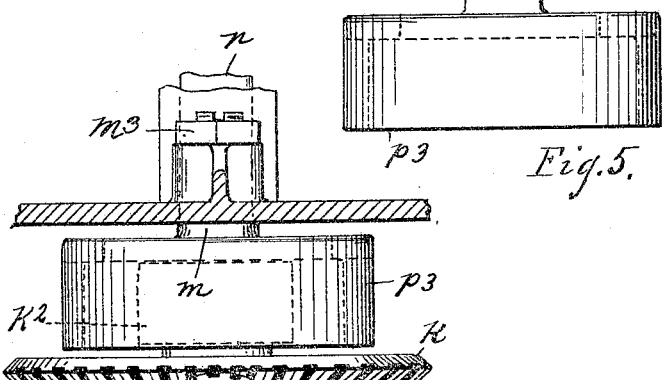
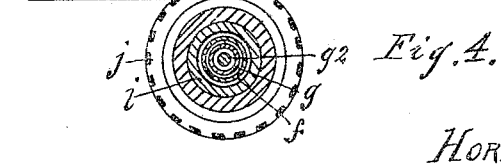

1,297,421.

Patented Mar. 18, 1919.
3 SHEETS—SHEET 3.

Inventor,
HORACE T. THOMAS.
By Ralzemond A. Parker
Attorney

UNITED STATES PATENT OFFICE.

HORACE T. THOMAS, OF LANSING, MICHIGAN.

STEERING-GEAR.

1,297,421.   Specification of Letters Patent.   Patented Mar. 18, 1919.

Application filed October 10, 1917. Serial No. 195,704.

*To all whom it may concern:*

Be it known that I, HORACE T. THOMAS, citizen of the United States, residing at Lansing, county of Ingham, State of Michigan, have invented a certain new and useful Improvement in Steering-Gears, and declare the following to be a full, clear, and exact description of the same, such as will enable others skilled in the art to which it pertains to make and use the same, reference being had to the accompanying drawings, which form a part of this specification.

My invention relates to steering gear for automobiles and consists in the improvements hereinafter described and pointed out in the claims.

In the accompanying drawings:

Figure 1 is an elevation, partly broken away, of a steering gear embodying my invention.

Fig. 2 is a section of the same in a plane along the center lines.

Fig. 3 is a detail elevation looking from the left of Fig. 2, parts being removed and all but the upper part of the large bevel wheel being broken away.

Fig. 4 is a plan view of the parts shown in Fig. 3.

Fig. 5 is a plan of the segmental gear and its shaft.

Fig. 6 is a detail central section of the parts shown in Fig. 5, a portion of the shaft being broken away.

Figure 9:
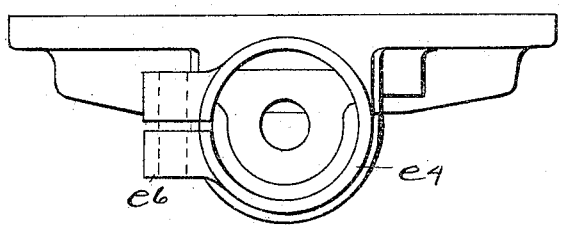
Fig. 9 is a plan view of the same.
Figure 7:
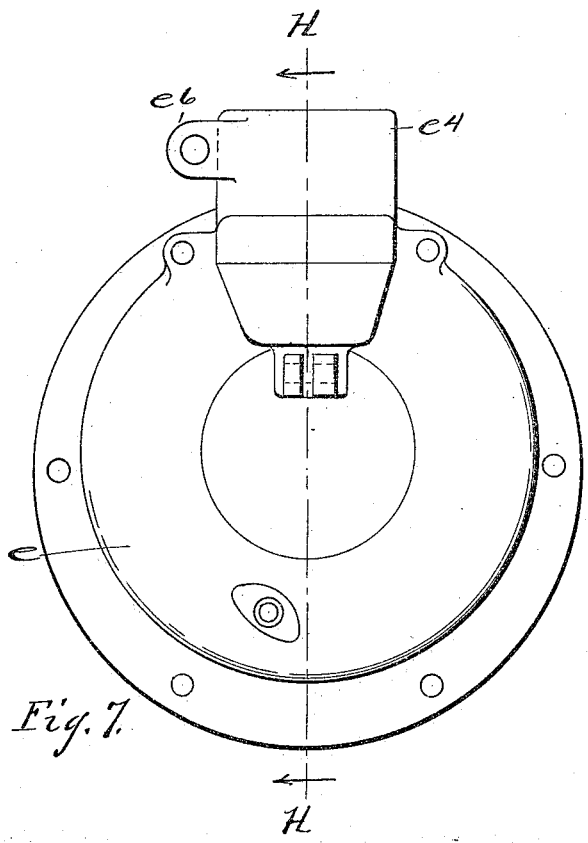
Fig. 7 is an elevation of the gear casing from the left of Fig. 2.
Figure 8:
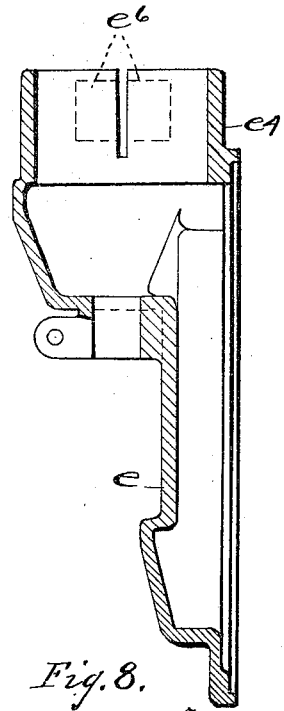
Fig. 8 is a section of the covering plate of the gear casing.

$a$ is the steering wheel, $b$ is the operating arm carrying the knuckle $c$ of the joint $d$, to which is secured the drag link leading to the steering wheel levers.

$e$ indicates the gear casing as a whole. This is made of two parts; $e^2$ in which are the bearings for the arbors, and $e^3$ which is an inclosing cover plate for the part $e^2$ and carries clamping sockets for constituent parts of the steering post mechanism. $e^4$ is a clamping socket formed integral with the cover part $e^3$ at the upper portion thereof and extending above said cover. $e^6$ (Fig. 1) is the clamping screw for the socket $e^4$. $e^5$ is a clamping socket located adjacent to, and directly below the socket $e^4$ and axially in line therewith.

$f$ is a tube having its lower end fitting into the socket $e^5$ and clamped therein. The tube $f$ extends upward to the center of the wheel $a$ and at this point has the usual segment clamped to it on which are the spark and throttle levers. $g$ and $g^2$ are the vertical shafts extending through the tube $f$ and out at the lower end of said tube where they are provided with lever arms to be connected with the throttle and spark adjusting means.

It will be observed that the sockets $e^4$ and $e$ are located well toward the top of the casing $e$ so that they may be connected directly to the mechanism that they are intended to operate.

$h$ is a tube having the cast and machined socket-fitting $h^2$ at its lower end. The fitting $h^2$ fits closely into the socket $e^4$ and is firmly clamped in position by the screw $e^6$ (Fig. 1). $i$ is a tube having the bevel gear $j$ at its lower end. The tube $i$ is sleeved around the tube $f$, located coaxially within the tube $h$ and having the steering wheel $a$ secured at its upper end.

$k$ is a large bevel gear wheel sleeved and adapted to turn upon an arbor $m$ secured in the wall of the casing $e$. The teeth of the wheel $k$ engage the teeth of the gear wheel $j$.

$q'$ is a friction reducing wheel, bearing against the smooth surface of the bevel gear wheel $k$ and acting to press said wheel into close engagement with the gear wheel $j$. The friction wheel $q'$ is pivoted in a sliding head $q^2$ which may move in a socket formed in the casing. $q^3$ is a spring pressing the wheel $q'$ against the bevel gear wheel $k$. $q^4$ is a screw threaded nut closing the outer end of the socket in which the head carrying the wheel $q'$ moves and serving to adjust the tension of the spring $q^3$, said spring resting at its inner end against the sliding head carrying the wheel $q'$ and at its outer end against the nut $q^4$.

$n$ is a shaft or arbor resting in broad bearings and extending through the wall of the casing $e$. The arm $b$ is clamped to the outer end of the shaft $n$. $p$ is a segmental gear rigidly united to the shaft $n$ at its inner end. The segment $p$ is formed in the arc of a circle at its outer end having its center in the axis of the shaft $n$ and is provided with internal gear teeth $p^3$.

$k^2$ is a pinion coaxial and rigidly connected with the bevel gear wheel $k$ and pivoted on the arbor $m$. The arbor $m$ is provided with a cylindrical eccentric portion $m^2$ which bears in the wall of the casing $e$ and extends to the outside of said casing where it may be turned to adjust the engagement of the pinion $k^2$ with the gear teeth $p^3$. $m^3$ is a nut by which the arbor $m\ m^2$ may be fixed in its adjusted position.

In the above described apparatus it will be observed that the engagement between the gears $j$ and $k$ may be readily adjusted by loosening the socket $e^4$ and adjusting the position of the tube $h\ h^2$ therein which tube carries the steering shaft and its bevel gear wheel $j$, or the gears $j$ and $k$ may be readily disengaged and engaged in a new position.

It will be observed that there is considerable reduction of motion and increase of power between the steering wheel and the operating lever $b$ and that the engaged gear surfaces are all broad and little liable to wear.

It will also be noticed that the mechanism is very compact, the casing small, and the operative levers $g$ and $g^2$ located well to the top of the casing.

The casing $e$ may be filled with grease for lubricating the various parts contained therein.

What I claim is:

1. In a steering gear, a pivoted arbor having an operating lever arm thereon, a toothed segment on said arbor having internal gear teeth, a pinion engaging said gear teeth, said pinion being located with its axis between the axis of said arbor and the teeth of said segment, said pinion being pivoted upon an arbor, said arbor having an eccentric portion resting in a bearing and being adapted to be turned to adjust the engagement of said pinion with the teeth of said segment.

2. In a steering gear, a gear casing provided with a clamping socket at its upper portion, a tube engaging in said socket and operating shafts bearing in said tube, a second clamping socket below and axially in line with the first named socket, a tube engaging in said second socket concentric with the first named tube and operating shafts engaging within said second tube.

3. In a steering gear, a gear casing provided with a clamping socket at its upper portion, a tube engaging in said socket and operating shafts bearing in said tube, a second clamping socket below and axially in line with the first named socket, a tube engaging in said second socket concentric with the first named tube and operating shafts engaging within said second tube, said second socket being closely adjacent to the first named socket.

4. In a steering gear, a pair of engaging gear wheels, a friction wheel pressing one of said bevel wheels toward engagement with the other of said bevel gear wheels and a tension member acting on said friction wheel, and means for adjusting the tension of said tension member.

5. In a steering gear, a casing containing a gear wheel, a clamping socket on said casing, a tube adapted to have its end adjustably inserted in said socket and clamped therein in its adjusted position, a steering shaft pivoted in said tube and having at its lower end a gear wheel adapted to engage with the first mentioned gear wheel, a clamping socket located axially in line with the first named socket, a tube within and coaxial with the first named tube and extending through the gear wheel thereon, the last named tube being adapted to fit and be clamped in said second socket.

In testimony whereof, I sign this specification.

HORACE T. THOMAS.

Copies of this patent may be obtained for five cents each, by addressing the "Commissioner of Patents, Washington, D. C."